United States Patent
Kurimura et al.

(10) Patent No.: US 10,465,548 B2
(45) Date of Patent: Nov. 5, 2019

(54) SHROUD AND METHOD FOR IMPLEMENTING ABRADABLE COATING

(71) Applicant: MITSUBISHI HEAVY INDUSTRIES AERO ENGINES, LTD., Aichi (JP)

(72) Inventors: Takayuki Kurimura, Tokyo (JP); Mineaki Matsumoto, Tokyo (JP); Tadayuki Hanada, Aichi (JP); Azusa Tamugi, Aichi (JP)

(73) Assignee: MITSUBISHI HEAVY INDUSTRIES AERO ENGINES, LTD., Aichi (JP)

( * ) Notice: Subject to any disclaimer, the term of this patent is extended or adjusted under 35 U.S.C. 154(b) by 0 days.

(21) Appl. No.: 15/781,996

(22) PCT Filed: Jan. 5, 2017

(86) PCT No.: PCT/JP2017/000116
§ 371 (c)(1),
(2) Date: Jun. 6, 2018

(87) PCT Pub. No.: WO2017/134976
PCT Pub. Date: Aug. 10, 2017

(65) Prior Publication Data
US 2018/0363487 A1    Dec. 20, 2018

(30) Foreign Application Priority Data
Feb. 4, 2016    (JP) .................... 2016-020202

(51) Int. Cl.
*C23C 4/10*    (2016.01)
*F01D 11/12*    (2006.01)
(Continued)

(52) U.S. Cl.
CPC .............. *F01D 11/122* (2013.01); *B05D 1/26* (2013.01); *B05D 3/02* (2013.01); *B05D 3/0254* (2013.01);
(Continued)

(58) Field of Classification Search
CPC ........................................................ C23C 4/01
(Continued)

(56) References Cited

U.S. PATENT DOCUMENTS

2005/0003172 A1    1/2005    Wheeler et al.
2005/0196271 A1    9/2005    Wilson et al.
(Continued)

FOREIGN PATENT DOCUMENTS

EP    2434102 A2    3/2012
EP    2857178 A1    4/2015
(Continued)

OTHER PUBLICATIONS

Written Opinion in PCT/JP2017/000116, dated Mar. 21, 2017. 20pp.
Extended European Search Report for European Application No. 17747140.6 dated Oct. 9, 2018; 10pp.

*Primary Examiner* — Tabatha L Penny
(74) *Attorney, Agent, or Firm* — Hauptman Ham, LLP

(57) ABSTRACT

A method for implementing an abradable coating comprising: a pattern-forming step in which, using a slurry containing ceramic particles and solvent, a slurry pattern is formed on the surface of a thermal barrier coating layer; and a firing step in which the slurry pattern formed on the surface of the thermal barrier coating layer is fired to form an abradable coating layer. A ceramic material included in the thermal barrier coating layer and ceramic particles included in the abradable coating layer are of the same type.

8 Claims, 1 Drawing Sheet

(51) Int. Cl.
| | |
|---|---|
| *B05D 7/14* | (2006.01) |
| *B05D 7/24* | (2006.01) |
| *B05D 3/02* | (2006.01) |
| *C23C 26/00* | (2006.01) |
| *F01D 9/04* | (2006.01) |
| *F01D 25/00* | (2006.01) |
| *F02C 7/00* | (2006.01) |
| *F02C 7/28* | (2006.01) |
| *C23C 4/18* | (2006.01) |
| *C23C 24/08* | (2006.01) |
| *C23C 28/04* | (2006.01) |
| *C23C 4/01* | (2016.01) |
| *C23C 4/134* | (2016.01) |
| *B05D 1/26* | (2006.01) |

(52) U.S. Cl.
CPC ............... *B05D 7/14* (2013.01); *B05D 7/24* (2013.01); *C23C 4/01* (2016.01); *C23C 4/10* (2013.01); *C23C 4/134* (2016.01); *C23C 4/18* (2013.01); *C23C 24/08* (2013.01); *C23C 24/082* (2013.01); *C23C 26/00* (2013.01); *C23C 28/042* (2013.01); *C23C 28/044* (2013.01); *F01D 9/04* (2013.01); *F01D 11/12* (2013.01); *F01D 25/00* (2013.01); *F01D 25/005* (2013.01); *F02C 7/00* (2013.01); *F02C 7/28* (2013.01); *F05D 2220/32* (2013.01); *F05D 2230/22* (2013.01); *F05D 2230/90* (2013.01); *F05D 2240/11* (2013.01); *F05D 2260/20* (2013.01); *F05D 2300/609* (2013.01); *F05D 2300/611* (2013.01)

(58) Field of Classification Search
USPC ........................................... 427/376.1
See application file for complete search history.

(56) References Cited

U.S. PATENT DOCUMENTS

| | | | |
|---|---|---|---|
| 2012/0107103 A1* | 5/2012 | Kojima | ............... F01D 11/122 |
| | | | 415/173.4 |
| 2015/0354392 A1* | 12/2015 | Lipkin | ............... F01D 11/122 |
| | | | 415/173.4 |
| 2015/0354393 A1 | 12/2015 | Lipkin et al. | |
| 2015/0354394 A1 | 12/2015 | Leblanc | |

FOREIGN PATENT DOCUMENTS

| | | | |
|---|---|---|---|
| EP | 2955333 A1 | | 12/2015 |
| JP | H3-214440 A | | 9/1991 |
| JP | 2005-179779 A | | 7/2005 |
| JP | 2010-151267 A | | 7/2010 |
| JP | 2013-64365 A | | 4/2013 |
| JP | 2013-71068 A | | 4/2013 |
| JP | 2016-6320 A | | 1/2016 |
| JP | 2016-6321 A | | 1/2016 |
| WO | 03026886 A2 | | 4/2003 |
| WO | WO 2003/026886 | * | 4/2003 |
| WO | 2015/126476 A2 | | 8/2015 |
| WO | 2015/130362 A2 | | 9/2015 |

* cited by examiner

SHROUD AND METHOD FOR IMPLEMENTING ABRADABLE COATING

RELATED APPLICATIONS

The present application is a National Phase of PCT/JP2017/000116, filed Jan. 5, 2017, and claims priority based on Japanese Patent Application No. 2016-020202, filed Feb. 4, 2016.

TECHNICAL FIELD

The present invention relates to a method for implementing an abradable coating to be formed on the surface of a base material, such as a shroud, and a shroud.

BACKGROUND ART

In the past, a coating, which includes a bond coat to be formed on the surface of a base material and a ceramic layer to be formed on the bond coat, has been known as a coating to be formed on a base material (for example, see PTL 1). The ceramic layer is formed in predetermined pattern by plasma spraying that is performed on the base material while a mask is used.

CITATION LIST

Patent Literature

[PTL, 1] Specification of U.S. Unexamined Patent Application Publication No. 2005/0003172

SUMMARY OF INVENTION

Technical Problem

However, since the mask where slits for forming a predetermined pattern are formed is used in PTL 1, there is a possibility that the slits of the mask may be closed (clogged) in a case in which plasma spraying is performed. In this case, since the mask should be more often replaced, it is difficult to improve implementation efficiency.

An object of the present invention is to provide a method for implementing an abradable coating, which can streamline the implementation an abradable coating having high free-cutting ability, and a shroud.

Solution to Problem

A method for implementing as abradable coating of the present invention includes a pattern-forming step of forming a slurry pattern on a surface of a base material by using slurry that contains ceramic particles and a solvent, and a firing step of forming an abradable coating layer by sintering the slurry pattern that is formed on the surface of the base material.

According to this structure, the slurry pattern is formed on the base material and is then sintered, so that the abradable coating layer can be formed on the base material. For this reason, since a mask and the like do not need to be used and the abradable coating layer having high free-cutting ability can be formed by simple steps, the implementation of an abradable coating can be streamlined.

Further, it is preferable that a porous ceramic layer is formed on the surface of the base material and, in the pattern-forming step, the slurry pattern is formed on the ceramic layer by using the slurry.

According to this structure, the ceramic layer and the abradable coating layer can be firmly joined to each other. That is, since the ceramic layer is porous, a solvent contained in the slurry enters the pores of the ceramic layer and ceramic particles are flocculated on an interface between the ceramic layer and the slurry. Since the slurry pattern is fired in this state, the ceramic layer and the abradable coating layer are firmly joined to each other.

Furthermore, it is preferable that a ceramic material contained in the ceramic layer and ceramic particles contained in the abradable coating layer are of the same type.

According to this structure, the thermal expansion coefficients of the ceramic layer and the abradable coating layer can be set to be equal to each other. For this reason, it is possible to inhibit the separation of the ceramic layer and the abradable coating layer that is caused by heat.

Moreover, it is preferable that the base material is a shroud in which a cooling flow passage is formed and, in the firing step, only a portion of the base material on which the slurry pattern is formed is heated and a cooling medium is made to circulate in the cooling flow passage.

According to this structure, since it is possible to inhibit heat from being input to the shroud during the firing of the slurry pattern, it is possible to reduce the influence of heat on the shroud.

Further, it is preferable that, in the pattern-forming step, while the slurry is discharged to the base material from a nozzle for discharging the slurry, the nozzle is moved by a multi-axis robot to form the slurry pattern.

According to this structure, since the slurry pattern can be stably formed on the base material by the multi-axis robot, productivity can be improved.

Furthermore, it is preferable that, in the pattern-forming step, the slurry is applied to the surface of the base material and a die member is pressed against the applied slurry to form the slurry pattern.

According to this structure, since the slurry pattern can be stably formed on the base material by the die member, productivity can be improved.

Moreover, it is preferable that the ceramic particles include coarse particles having a large particle size and fine particles having a particle size smaller than the particle size of the coarse partoicie and a ratio of the volume of the coarse particles to the volume of the fine particles satisfies a range of "$50/50 \leq V1/V2 \leq 90/10$" in a case in which the volume of the coarse particles is denoted by V1 and the volume of the fine particles is denoted by V2.

According to this structure, slurry suitable for the pattern-forming step can be used and the abradable coating layer to be formed after the firing step can be formed as an appropriate abradable coating layer. It is more preferable that a ratio of the volume of the coarse particles to the volume of the fine particles is about 7/3.

Further, it is preferable that an average particle size of the coarse particles is in the range of 1 μm to 10 μm and an average particle size of the fine particles is in the range of 0.01 μm to 1 μm.

According to this structure, slurry more suitable for the pattern-forming step can be used and the abradable coating layer to be formed after the firing step can be formed as a more appropriate abradable coating layer likewise.

Furthermore, it is preferable that the solvent is water.

According to this structure, since water, which is harder to be volatilized than other solvents, such as alcohol, the change of the slurry over time can be inhibited. For this reason, the slurry pattern can be stably formed during mass production. Further, since the solvent is consumables, running costs can be reduced in a case in which inexpensive water is used as the solvent.

A shroud of the present invention is a shroud that includes a porous ceramic layer formed on a surface thereof facing a rotor blade. The shroud includes an abradable coating layer that is formed on the surface of the ceramic layer. A ceramic material contained in the ceramic layer and a ceramic material contained in the abradable coating layer are of the same type.

According to this structure, the ceramic layer and the abradable coating layer can be firmly joined to each other. Further, since the thermal expansion coefficients of the ceramic layer and the abradable coating layer can be set to be equal to each other, it is possible to inhibit the separation of the ceramic layer and the abradable coating layer that is caused by heat. For this reason, a highly-reliable abradable coating layer can be formed.

DESCRIPTION OF EMBODIMENTS

An embodiment of the present invention will be described in detail below with reference to the drawings. The present invention is not limited by this embodiment. Further, components of the following embodiment include components that can be substituted and easily supposed by those skilled in the art or substantially the same components as the components of the following embodiment. Furthermore, components described below can be appropriately combined. In a case in which there are a plurality of embodiments, the respective embodiments can also be combined.

EMBODIMENT

Figure 1:
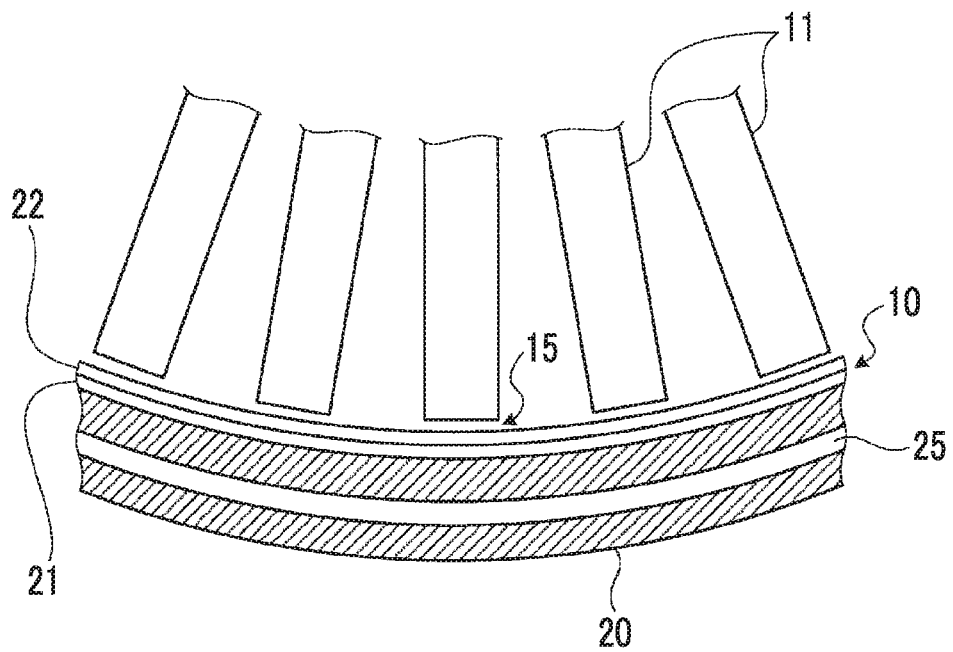
FIG. 1 is a diagram showing the schematic structure of a shroud on which an abradable coating is implemented by an implementing method according to this embodiment.
Figure 2:
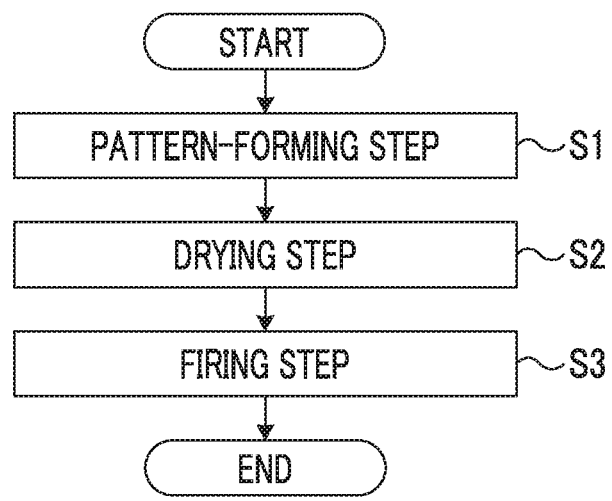
FIG. 2 is a flowchart relating to method for implementing an abradable coating according to this embodiment.

FIG. 1 is a diagram showing the schematic structure of a shroud on which an abradable coating is implemented by an implementing method according to this embodiment. FIG. 2 is a flowchart relating to a method for implementing an abradable coating according to this embodiment.

A method for implementing an abradable coating according to this embodiment is applied to a shroud, which is to be provided in a gas turbine, such as a gas turbine generator or a gas turbine engine, as an implementation object. First, a shroud 10 will be briefly described prior to the method for implementing an abradable coating.

The shroud 10 is a casing provided to surround the radially outside of a plurality of rotor blades 11 that are arranged on a rotating shaft at predetermined intervals in a circumferential direction. For example, high-temperature working fluid, such as combustion gas, circulates in the shroud 10, and the plurality of rotor blades 11 are rotated about the rotating shaft by the working fluid. That is, the shroud 10 is a stationary member, and the plurality of rotor blades 11 are rotatable members that are rotated about the rotating shaft. Further, a clearance 15 is formed between the shroud 10 and each rotor blade 11 in the radial direction of the rotating shaft.

The shroud 10 includes a shroud body 20, a thermal barrier coating layer (ceramic layer) 21, and an abradable coating layer 22. The shroud body 20 is made of, for example, a heat-resistant metallic material, such as a Ni-based superalloy, and a cooling flow passage 25 is formed in the shroud body 20. A cooling medium, such as cooling air, circulates in the cooling flow passage 25 so as to cool the shroud body 20 that is heated by high-temperature working fluid circulating in the shroud 10. Further, the cooling flow passage 25 can be used in a method for implementing an abradable coating to be described later.

The thermal barrier coating layer (TBC: thermal barrier coating) 21 is formed on the surface of the shroud body 20, that is, the surface of the shroud body 20 facing the rotor blades 11. The thermal barrier coating layer 21 is formed of a porous ceramic layer to inhibit heat from being input to the shroud body 20 from the high-temperature working fluid.

A zirconia-based ceramic material, which is an oxide-based ceramic material, is used for the thermal barrier coating layer 21, and $ZrO_2$ is used for the thermal barrier coating layer 21 in this embodiment. The porosity of the thermal barrier coating layer 21 is in the range of, for example, 5% to 15%, and is 10% in this embodiment. The thermal barrier coating layer 21 is evenly formed on the surface of the shroud body 20 as a layer having a uniform thickness by, for example, ceramic spraying (APS: atmospheric plasma spraying.

The abradable coating layer 22 is formed on the surface of the thermal barrier coating layer 21. The abradable coating layer 22 is a seal material that is used to inhibit working fluid from leaking from the clearance 15 formed between the shroud 10 and each rotor blade 11, and is subjected to free-cutting by each rotor blade 11. Since the abradable coating layer 22 is formed in the shape of a fin protruding from the thermal barrier coating layer 21, a predetermined pattern is formed on the thermal barrier coating layer 21. For example, a wavy fin is used as the pattern, but the shape of the pattern is not limited thereto and may be any shape that inhibits working fluid from leaking.

The same type of ceramic material as the thermal barrier coating layer 21 is used for the abradable coating layer 22. For example, a zirconia-based ceramic material is used for the abradable coating layer 22, and $ZrO_2$ is used for the abradable coating layer 22 in this embodiment. The porosity of the abradable coating layer 22 is in the range of, for example, 10% to 40%, and is 20% is this embodiment. The abradable coating layer 22 is formed on the surface of the thermal barrier coating layer 21 by a method for implementing an abradable coating to be described later.

Next, a method for implementing as abradable coating will be described with reference to FIG. 2. In the implementing method of this embodiment, the shroud body 20 on which the thermal barrier coating layer 21 is implemented is applied as a base material and the abradable coating layer 22 is formed on the surface of the thermal barrier coating layer 21. The shroud body 20 on which the thermal barrier coating layer 21 is implemented is applied as the base material in this embodiment, but the present invention is not limited to this structure and a porous ceramic material may be applied as the base material.

In the implementing method of this embodiment, first, a slurry pattern is formed on the surface of the thermal barrier coating layer 21 by using slurry (Step S1: pattern-forming step).

Here, the slurry, which is used in the pattern-forming step S1, will be described. The slurry contains ceramic particles, a solvent, a binder, and a dispersant.

The ceramic particles include coarse particles and fine particles, and zirconia-based (for example, $ZrO_2$) ceramic particles are used as either particles in this embodiment. In a case in which the volume of coarse particles denoted by V1 and the volume of fine particles is denoted by V2, a ratio (V1/V2) of the volume of coarse particles to the volume of fine particles satisfies the range of "50/50≤V1/V2≤90/10" and is about 7/3 in this embodiment. Further, the average particle size of the coarse particles is in the range of 1 μm to 10 μm, and coarse particles having an average particle size of 3.4 μm are used in this embodiment. The average particle size of the fine particles is in the range of 0.01 μm to 1 μm, and fine particles having an average particle size of 0.1 μm are used in this embodiment.

For example, water, such as distilled water, is used as the solvent, and the solvent is mixed so that the volume concentration of the ceramic particles in the slurry is in the range of 20 to 60 vol %. Since water, which is harder to be volatilized than other solvents, such as alcohol, is used as the solvent in this embodiment, a change in the viscosity or the like of the slurry over time is inhibited.

For example, polyvinyl alcohol (PVA) is used as the binder, and the binder is mixed so that the percentage by mass of the binder is in the range of 1 to 10 wt % with respect to the mass of the ceramic particles. For example, an ammonium salt of a porycarboxylic acid is used as the dispersant, and the dispersant is mixed so that the percentage by mass of the dispersant is in the range of 0.1 to 0.5 wt % with respect to the mass of the ceramic particles.

The viscosity of the slurry, which is composed as described above, is 16.4 mPa·s in this embodiment. The slurry is an example and is not limited to the above-mentioned composition. For example, a ratio of the coarse particles to the fine particles needs to be increased in a case in which an abradable coating layer 22 having higher porosity is required. For example, the volume concentration of ceramic powder needs to be increased or the amount of the binder to be added needs to be increased in a case in which slurry having higher viscosity is required.

In a case in which a slurry pattern is formed on the thermal barrier coating layer 21 by using the slurry, a nozzle for discharging the slurry and a multi-axis robot for moving the nozzle are used. That is, in the pattern-forming step 21, while the slurry is discharged to the thermal barrier coating layer 21 from the nozzle, the nozzle is moved by the multi-axis robot to form a predetermined slurry pattern.

Here, since the slurry is applied to the porous thermal barrier coating layer 21, a part of the solvent contained in the slurry reaches the thermal barrier coating layer 21. In this case, some ceramic particles enter the pores of the thermal barrier coating layer 21 with the movement of the solvent. After the pattern-forming step S1, a drying step S2 is performed subsequently.

In the drying step S2, the solvent contained in the slurry pattern is volatilized through natural drying or drying by heating. After the drying step S2, a firing step S3 is performed subsequently.

In the firing step S3, the slurry pattern formed on the surface of the thermal barrier coating layer 21 is sintered, so that the abradable coating layer 22 is formed. Specifically, in the firing step S3, only a portion of the thermal barrier coating layer 21 on which the slurry pattern is formed is directly heated by the flame of a burner or the like or is directly heated by laser irradiation. In this case, in the firing step S3, cooling medium is made to circulate in the cooling flow passage 25 of the shroud body 20 to cool the shroud body 20 and the thermal barrier coating layer 21. Accordingly, in the firing step S3, the slurry pattern is heated to a firing temperature, so that the abradable coating layer 22 is formed on the thermal barrier coating layer 21.

According to this embodiment, as described above, the slurry pattern is formed on the thermal barrier coating layer 21 and is then sintered, so that the abradable coating layer 22 can be formed on the thermal barrier coating layer 21. For this reason, since a mask and the like do not need to be used and the abradable coating layer 22 having high free-cutting ability can be formed by simple steps, the implementation of an abradable coating can be streamlined.

Further, according to this embodiment, the slurry pattern can be formed on the porous thermal barrier coating layer 21. For this reason, ceramic particles contained in the slurry enter the pores of the thermal barrier coating layer 21 and the slurry pattern is fired in this state, so that the thermal barrier coating layer 21 and the abradable coating layer 22 can be firmly joined to each other.

Furthermore, according to this embodiment, since the ceramic material of the thermal barrier coating layer 21 and the ceramic material of the abradable coating layer 22 can be of the same type, the thermal expansion coefficients of the thermal barrier coating layer 21 and the abradable coating layer 22 can be set to be equal to each other. For this reason, it is possible to inhibit the separation of the thermal barrier coating layer 21 and the abradable coating layer 22 that is caused by heat.

Moreover, according to this embodiment, a cooling medium can be made to circulate in the cooling flow passage 25 of the shroud body 20 during the firing of the slurry pattern. Accordingly, since it is possible to inhibit heat from being input to the shroud 10, it is possible to reduce the influence of heat on the shroud 10.

Further, according to this embodiment, since the nozzle and the multi-axis robot are used in the pattern-forming step S1 and a slurry pattern can be stably formed on the thermal barrier coating layer 21 by the multi-axis robot, productivity can be improved.

Furthermore, according to this embodiment, since the above-mentioned slurry is used, slurry suitable for the pattern-forming step S1 can be used and the abradable coating layer 22 to be formed after the firing step S3 can be formed as an appropriate abradable coating layer.

Moreover, according to this embodiment, since water is used as the solvent, the change of the slurry over time can be inhibited. Accordingly, a slurry pattern can be stably formed during mass production. Further, since the solvent is consumables, running costs can be reduced in a case in which inexpensive water is used as the solvent.

Yttria-stabilized zirconia (YSZ) is used as ceramic materials used for the thermal barrier coating layer 21 and the abradable coating layer 22 in this embodiment, but the ceramic materials are not limited thereto. For example, an alumina-based ceramic material or a rare-earth silicate-based ceramic material may be used.

Further, only a portion of the thermal barrier coating layer on which the slurry pattern is formed is heated in this embodiment, but the entire shroud 10 may be put in a heating furnace and a method of heating the slurry pattern is not particularly limited.

Furthermore, the nozzle and the multi-axis robot are used in the pattern-forming step S1 is this embodiment, but the present invention is not limited to this structure. For example, in the pattern-forming step S1, slurry may be applied to the surface of the thermal barrier coating layer 21 and a die member may be pressed against the applied slurry to form a slurry pattern. Since a slurry pattern can be stably formed on the thermal barrier coating layer 21 by the die member, productivity can be improved even in this structure.

REFERENCE SIGNS LIST

10: shroud
11: rotor blade
15: clearance
20: shroud body
21: thermal barrier coating layer
22: abradable coating layer
25: cooling flow passage

The invention claimed is:

1. A method for implementing an abradable coating, the method comprising:
    a pattern-forming step of forming a slurry pattern on a surface of a base material by using slurry that contains ceramic particles and a solvent; and
    a firing step of forming an abradable coating layer by sintering the slurry pattern that is formed on the surface of the base material,
    wherein the base material is a shroud in which a cooling flow passage is formed, and
    in the firing step, only a portion of the base material on which the slurry pattern is formed is heated and a cooling medium is made to circulate in the cooling flow passage.

2. The method for implementing an abradable coating according to claim 1,
    wherein a porous ceramic layer is formed on the surface of the base material, and
    in the pattern-forming step, the slurry pattern is formed on the ceramic layer by using the slurry.

3. The method for implementing an abradable coating according to claim 2,
    wherein a ceramic material contained in the ceramic layer and ceramic particles contained in the abradable coating layer are of the same type.

4. The method for implementing an abradable coating according to claim 1,
    wherein in the pattern-forming step, while the slurry is discharged to the base material from a nozzle for discharging the slurry, the nozzle is moved by a multi-axis robot to form the slurry pattern.

5. The method for implementing an abradable coating according to claim 1,
    wherein in the pattern-forming step, the slurry is applied to the surface of the base material and a die member is pressed against the applied slurry to form the slurry pattern.

6. The method for implementing an abradable coating according to claim 1,
    wherein the ceramic particles include coarse particles having a large particle size and fine particles having a particle size smaller than the particle size of the coarse particle, and
    a ratio of the volume of the coarse particles to the volume of the fine particles satisfies a range of "$50/50 \leq V1/V2 \leq 90/10$" in a case in which the volume of the coarse particles is denoted by V1 and the volume of the fine particles is denoted by V2.

7. The method for implementing an abradable coating according to claim 6,
    wherein an average particle size of the coarse particles is in the range of 1 μm to 10 μm, and
    an average particle size of the fine particles is in the range of 0.01 μm to 1 μm.

8. The method for implementing an abradable coating according to claim 1,
    wherein the solvent is water.

* * * * *